C. H. FERGUSON.
BOLT AND NUT LOCK.
APPLICATION FILED JUNE 16, 1909.
950,282.
Patented Feb. 22, 1910.
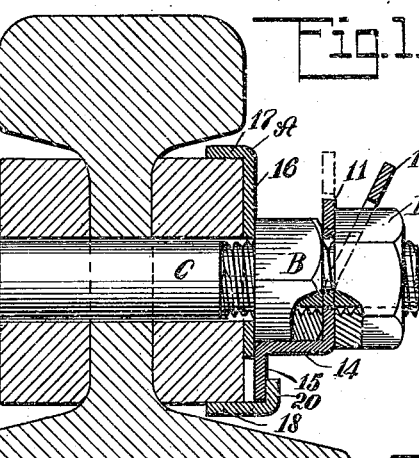
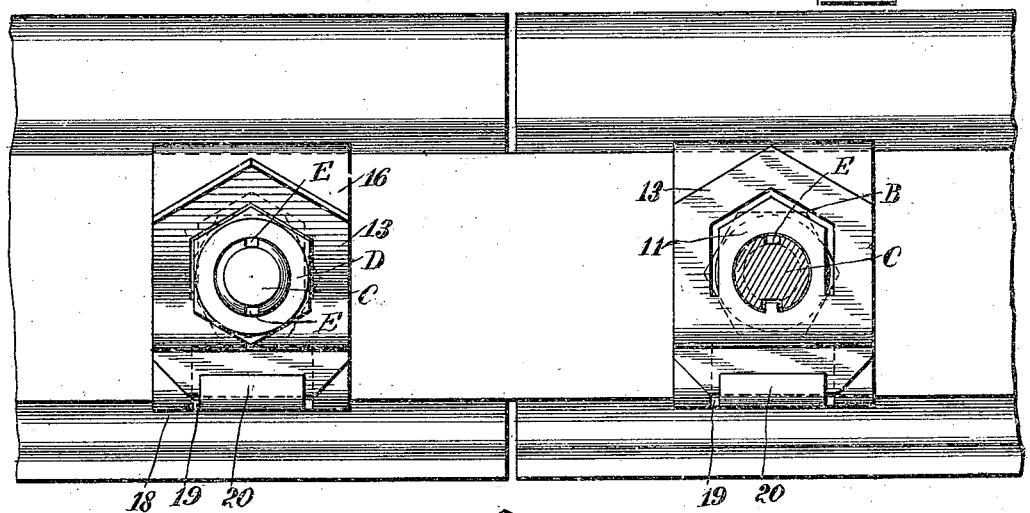
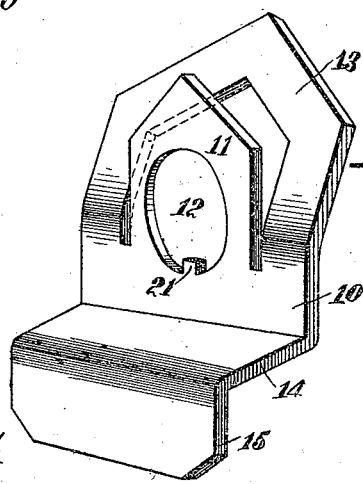
WITNESSES
INVENTOR
Charles H. Ferguson
BY
ATTORNEYS

UNITED STATES PATENT OFFICE.

CHARLES H. FERGUSON, OF JERSEY CITY, NEW JERSEY.

BOLT AND NUT LOCK.

950,282.

Specification of Letters Patent. Patented Feb. 22, 1910.

Application filed June 16, 1909. Serial No. 502,472.

*To all whom it may concern:*

Be it known that I, CHARLES H. FERGUSON, a citizen of the United States, and a resident of Jersey City, in the county of Hudson and State of New Jersey, have invented a new and Improved Bolt and Nut Lock, of which the following is a full, clear, and exact description.

This invention relates to certain improvements in bolt and nut locks, and relates more particularly to that type of nut lock in which there is employed a plate or washer having a yoke or peripheral rim which may be bent up to partially inclose the nut, or at least engage with a plurality of sides of the latter. In my improved nut lock, I so form the plate or washer that it is automatically held against rotation and serves not only to lock one nut in place but may also lock either the bolt or a second nut, or all three.

Reference is to be had to the accompanying drawings, forming a part of this specification, in which similar characters of reference indicate the same parts in all the figures, and in which—

Figure 1 is a transverse section through a railroad rail having the bolt holding the fish plates locked by my improved device;
Fig. 2 is a side elevation of the parts shown in Fig. 1, one of the ends and a portion of the bolt being removed from the lock shown at the right-hand end of the figure; and Fig. 3 is a perspective view of the locking plate or washer shown in Figs. 1 and 2.

In the drawings I have illustrated my improved nut lock on a bolt used for securing the fish plate of a railroad rail, but I wish it to be distinctly understood that the nut lock may be used on any form of bolt employed for securing two members together. In my improved construction, I do not embody any changes whatsoever in the nut itself or in the bolts, so that my improved locking means may be employed with the ordinary bolt and ordinary nut commonly used.

The nut lock involves a plate or washer 10 having a body portion 11, which latter has an opening 12 to receive the bolt. Integral with this body portion is a yoke or peripheral rim 13, separated from the body portion by a substantially U-shaped slot. The shape of this slot is dependent upon the shape of the nut. In case the nut is hexagonal, as illustrated, then the slot would have two substantially parallel portions spaced apart a distance substantially equal to or slightly greater than the width of the nut, and having two inclined portions meeting in a point and connecting the ends of the parallel portions of the slot. The terminal portions of the rim are disposed at diametrically opposite points in respect to the central opening 12, and the rim may be bent upwardly so as to engage with approximately one-half the periphery of the nut. If the nut be hexagonal then the rim or yoke will contact with four sides of the nut.

At the rear of the body-portion opposite to the yoke, the washer has a flange 14 extending at substantially right angles to the plane of the body portion and serving in the form shown in Figs. 1, 2 and 3, as means for locking a second nut. This flange contacts with the side of a second nut, and prevents rotation of the latter. At the free edge of the flange 14, I provide a second flange 15 bent to lie in a plane substantially parallel to the plane of the body portion. This flange serves to prevent rotation of the plate in respect to the members held together by the bolt. This flange preferably engages with and is retained by a second plate 16 having a body portion adapted to lie between the surface of the member A to be held and the nut. The plate 16 is provided with downwardly-extending flanges 17 and 18 for engagement with opposite sides of the member A, so that the plate cannot rotate in respect to said member. The plate is provided with a slot 19 defining a tongue 20, which latter is struck up to lie substantially parallel to the body of the plate, and to receive beneath it the flange 15 of the main locking plate. This tongue holds the flange 15 against rotation, so that the plate 10 cannot rotate in respect to the member A.

In assembling the parts, the plate 16 is first placed in position and the nut B is screwed on to the bolt C and tightened to the desired extent. The plate 10 is then placed in position with the flange 14 in engagement with one side of the nut B, and the flange 15 is locked in position by the bending down of the tongue 20. The nut B is thus effectively locked against rotation. A second nut D is then screwed on to the bolt to hold the plate 10 between the two nuts, and the yoke 13 is bent outwardly to engage with the sides of the nut D to hold the latter against rotation. Thus, the plate 10 is itself locked against rotation by the flange 15 and locks the two nuts against rotation in respect to the bolt or in respect to each other by the flange 14 and the yoke or rim 13. In order to lock the bolt itself against rotation, said bolt is preferably provided with a keyway E along one or more sides, and the body portion of the plate 10 is provided with a tongue or flange 21 integral therewith and extending into the opening 12, so as to slide in one of the grooves E and to prevent relative rotation of the bolt and plate.

Having thus described my invention, I claim as new and desire to secure by Letters Patent:

1. A bolt and nut lock, comprising a plate having an aperture therethrough to receive the bolt and having a peripheral rim or yoke stamped from and integral with the plate and adapted to be offset outwardly from the plane of the plate to partially encircle the nut and to prevent rotation of the latter, said plate also having a flange at one edge thereof and extending in the opposite direction from said rim or yoke and adapted to engage with the side of a second nut to prevent rotation of the latter, and a second flange integral with the first-mentioned flange and at the edge thereof for preventing the rotation of the plate.

2. A bolt and nut lock, including a plate having a yoke or peripheral rim adapted to engage with a nut to prevent rotation of the latter and having a flange at one edge thereof, a second plate having marginal flanges for engaging with the sides of the member to be held to prevent rotation of said second plate, and having a tongue adapted to engage with the flange of the first-mentioned plate to prevent rotation of the latter.

3. A bolt and nut lock, comprising a plate having an aperture therethrough to receive a bolt, and having means integral therewith and adapted to engage with a nut to prevent the rotation of the latter, said plate having a flange at one edge thereof and extending in the opposite direction from said last-mentioned means, adapted to engage with the side of a second nut, to prevent the rotation of the latter, and a second flange on said plate adapted to engage means for preventing the rotation of the plate independently of the bolt or nuts.

4. A bolt and nut lock, including a plate having a yoke or peripheral rim adapted to engage with a nut, to prevent rotation of the latter, and having a flange at one edge thereof, and a second plate having means for engaging with the sides of the member to be held by the bolt, to prevent rotation of the second plate, and also having means adapted to engage with the flange of the first-mentioned plate, to prevent rotation of the latter.

In testimony whereof I have signed my name to this specification in the presence of two subscribing witnesses.

CHARLES H. FERGUSON.

Witnesses:
 ANNA D. FERGUSON,
 JOHN H. RAFTER.